(12) United States Patent
Merrill et al.

(10) Patent No.: US 8,600,415 B2
(45) Date of Patent: Dec. 3, 2013

(54) SYSTEM AND METHOD FOR DISTRIBUTING ADVERTISEMENTS TO THIRD-PARTY SMS CONTENT PROVIDERS

(75) Inventors: Derek D Merrill, San Francisco, CA (US); Alec S. Andronikov, San Francisco, CA (US)

(73) Assignee: MCORE International, Inc., Bellevue, WA (US)

( * ) Notice: Subject to any disclaimer, the term of this patent is extended or adjusted under 35 U.S.C. 154(b) by 1494 days.

(21) Appl. No.: 12/215,003

(22) Filed: Jun. 24, 2008

(65) Prior Publication Data

US 2009/0011781 A1    Jan. 8, 2009

Related U.S. Application Data

(60) Provisional application No. 60/936,989, filed on Jun. 25, 2007.

(51) Int. Cl.
*H04W 4/00* (2009.01)
*G06Q 30/00* (2012.01)

(52) U.S. Cl.
USPC ............... 455/466; 705/14.49; 455/414.1

(58) Field of Classification Search
USPC ......... 455/414.1–414.4, 466; 705/14.4–14.73
See application file for complete search history.

(56) References Cited

U.S. PATENT DOCUMENTS

| | | | |
|---|---|---|---|
| 2006/0026067 A1* | 2/2006 | Nicholas et al. | 705/14 |
| 2007/0061246 A1* | 3/2007 | Ramer et al. | 705/37 |
| 2007/0088851 A1* | 4/2007 | Levkovitz et al. | 709/246 |
| 2008/0153520 A1* | 6/2008 | Kirtane | 455/466 |
| 2008/0243619 A1* | 10/2008 | Sharman et al. | 705/14 |
| 2008/0287150 A1* | 11/2008 | Jiang et al. | 455/466 |
| 2010/0062745 A1* | 3/2010 | Silk | 455/411 |

* cited by examiner

*Primary Examiner* — George Eng
*Assistant Examiner* — Marcus Hammonds
(74) *Attorney, Agent, or Firm* — Lowe Graham Jones, PLLC (57) ABSTRACT

Methods, apparatuses and systems enabling delivery of advertising to third-party short message service (SMS) content providers. An SMS content provider sends a request to an ad server for an advertisement to append to an outgoing mobile terminated message. The ad server retrieves an advertisement from the ad database that meets available character constraints as well as targeting parameters based on user area code, time, content-channel, and content of the message. If targeting parameters are satisfied, the ad server sends advertisement to SMS content provider to append to outgoing message. The ad server sends receipt of delivery to reporting database. Methods, apparatuses and systems are described for retrieving advertisements for delivery to mobile users, tracking retrieval of advertisements, and receiving compensation in exchange for advertisement distribution. Methods, apparatuses and systems are described for creating text-based advertisements, setting targeting parameters, and viewing ad delivery reports across third-party SMS content affiliates.

27 Claims, 6 Drawing Sheets

FIG. 4 *Annotated Sheet : Image enlarged, converted to black and white*

MoVoxx Intxt Administration (MIA)　　　　　　　　　　　　　　　　Gap | dave@gap.com | Log Out

Advertiser　　Publisher　　Admin

»edit ad
»delete ad
»copy ad

Home > View Ad

Summer Sale

*status:* active
*start:* May 01, 2007
*end:* May 31, 2007
*max daily spend:* $500.00

*ad text:*   expanded  *GAP Sale. 10% off jeans: Txt GAP to 88188
         standard  *GAP Sale: Txt GAP to 88188
         short  *Txt GAP to 88188

*ad response1:* GAP Coupon! 10% off any pair of GAP stretch jeans. *Show TXT to redeem* Exp:01/13/07. Valid only one per customer. [Reply 1 for GAP coupons and news alerts]

*ad response2:* You will now receive Gap coupons. Reply with STOP to opt-out anytime. Reply with HELP for more info.

*area codes:*   480  SCOTTSDALE-TEMPE  ARIZONA
            213  LOS ANGELES  CALIFORNIA

*time:*   Mon  00:00  to  00:00
      Tue  00:00  to  00:00
      Wed  00:00  to  00:00

*channel:* Entertainment

*price:* $0.10

FIG. 5 *Annotated Sheet : Image enlarged, converted to black and white*

MoVoxx Intxt Administration (MIA)                                    Gap | dave@gap.com | Log Out

Advertiser    Publisher    Admin

Home > View Stats

Create Report
ad:             [all]
date range:     [all time]     (drop down)

from  [may]  [1]  [2007]
                to    [may]  [7]  [2007]

summarize by:   [day]          (drop down)

all ads > may 1, 2006 to may 7, 2007 > summarized by day

| Date | Ad | Impressions | Price | Cost | Day Total |
|---|---|---|---|---|---|
| May 1 | Summer Sale | 5,500 | $0.10 | $550.00 | |
|  | Fall Sale | 7,800 | $0.08 | $624.00 | $1,174.00 |
| May 2 | Summer Sale | 10,100 | $0.10 | $1,010.00 | |
|  | Fall Sale | 12,400 | $0.08 | $992.00 | $2,002.00 |
| May 3 | Summer Sale | 14,700 | $0.10 | $1,470.00 | |
|  | Fall Sale |  | $0.08 | $0.00 | $1,470.00 |
| May 4 | Summer Sale | 19,300 | $0.10 | $1,930.00 | |
|  | Fall Sale | 21,600 | $0.08 | $1,728.00 | $3,658.00 |
| May 5 | Summer Sale | 23,900 | $0.10 | $2,390.00 | |
|  | Fall Sale | 26,200 | $0.08 | $2,096.00 | $4,486.00 |
| May 6 | Summer Sale | 28,500 | $0.10 | $2,850.00 | |
|  | Fall Sale | 30,800 | $0.08 | $2,464.00 | $5,314.00 |
| May 7 | Summer Sale | 33,100 | $0.10 | $3,310.00 | |

FIG. 6 *Annotated Sheet : Image enlarged, converted to black and white*

MoVoxx Intxt Administration (MIA)  UpSnap | joe@upsnap.com | Log Out

Advertiser | Publisher | Admin

Home > View Stats

Create Report sms site: [all]
date range: [all time] (drop down)

| | from | may | 1 | 2007 |
| | to | may | 7 | 2007 | summarize by: [day] (drop down)

all channels > may 1, 2006 to may 7, 2007 > summarized by day

| Date | SMS Site | Impressions | AvgPrice | Revenue | DailyTotal |
|---|---|---|---|---|---|
| May 1 | Search | 5,500 | $0.05 | $275.00 | |
| | News Alerts | 7,800 | $0.06 | $468.00 | $743.00 |
| May 2 | Search | 10,100 | $0.05 | $505.00 | |
| | News Alerts | 12,400 | $0.06 | $744.00 | $1,249.00 |
| May 3 | Search | 14,700 | $0.05 | $735.00 | |
| | News Alerts | 17,000 | $0.06 | $1,020.00 | $1,755.00 |
| May 4 | Search | 19,300 | $0.05 | $965.00 | |
| | News Alerts | 21,600 | $0.06 | $1,296.00 | $2,261.00 |
| May 5 | Search | 23,900 | $0.05 | $1,195.00 | |
| | News Alerts | 26,200 | $0.06 | $1,572.00 | $2,767.00 |
| May 6 | Search | 28,500 | $0.05 | $1,425.00 | |
| | News Alerts | 30,800 | $0.06 | $1,848.00 | $3,273.00 |
| May 7 | Search | 33,100 | $0.05 | $1,655.00 | | ns
SYSTEM AND METHOD FOR DISTRIBUTING ADVERTISEMENTS TO THIRD-PARTY SMS CONTENT PROVIDERS

PRIORITY CLAIM

This application claims the benefit under 35 USC 119(e) to U.S. Patent Application No. 60/936,989, filed on Jun. 25, 2007, which is incorporated herein by reference in its entirety.

FIELD OF THE INVENTION

The present invention relates to methods and systems for distributing advertisements for wireless transmission over short message service (SMS), more specifically, the systems and methods for data exchange between an advertisement aggregator and an SMS service provider to facilitate distribution, targeting, and reporting of advertisements.

BACKGROUND OF THE INVENTION

The adoption of personal wireless communications devices has been rapid and revolutionary. Today there are more mobile users than internet users worldwide because of the desire for immediate communications methods and wide availability and instant access to telecommunications networks. Aside from voice services, other services for communication and data transfer have seen wide adoption, such as: SMS, MMS, WAP, and IM. In particular, SMS as a communications method has seen the greatest adoption because of its strengths as a communications tool, cost savings against voice, inclusion in basic voice service plans, and wide device compatibility.

Worldwide, SMS has seen greater adoption than in the United States. This is due in part to the relative cheapness of voice service plans in the U.S. compared to other countries, the availability of flat-rate voice plans, and American's voice-centric communications behavior. In November 2001, wireless service providers began to connect their networks for text messaging, allowing subscribers on different networks to exchange text messages. The phenomenon of text messaging had caught on in Europe and Asia a few years earlier, but the U.S. had many unique challenges in combining networks running different technologies (CDMA, TDMA, GSM, iDEN) to enable truly open text messaging across all networks. Since the groundbreaking launch of AT&T Wireless' inter-carrier text messaging program in November 2001, followed by a CTIA-led interoperability consortium including national carriers and others early in 2002, the number of text messages in the United States has grown astronomically to over twenty (20) billion messages sent every month.

SMS traffic in the U.S., especially among younger users has seen dramatic growth. In reaction to the wide adoption of SMS among the highly sought after 18-34 year old demographic, marketers are beginning to use the platform for marketing purposes. The one-to-one nature of advertising on a personal wireless device as well as the instant nature of SMS messages makes for an attractive marketing method. However, due to the opt-in nature of SMS marketing, the process of promoting a mobile campaign to generate exposure still requires considerable resources. Often, costly traditional methods of advertising such as TV, radio, and print are the means of promoting mobile campaigns. These methods are inefficient because they are not targeted specifically to a mobile savvy audience.

Aside from pure mobile marketing campaigns, the growing popularity of this communications method has led to the formation of new SMS services that provide free information and content to mobile users. These services provide updated information via SMS such as weather alerts, real-time stock quotes, sports scores, and other content. As well, other services are enabling mobile social networking services through group messaging services via SMS. These services are focused providing a free service or content to grow their user base. And, similar to internet websites, these large user bases can support their free services through advertising. Often many outgoing messages sent by these SMS services contain unused character space. Some have begun to sell this space to advertiser directly, but most SMS services prefer to focus on building their user base rather than build a sales team. An opportunity exists for an aggregator to focus on acquiring advertisers and provide advertisements to append to the outgoing messages of third-party SMS services. In return, the SMS services earn a commission based on the advertisements that are sent. Likewise, advertisers who want to reach a mobile audience, do not need to form a relationship with one or many SMS services to place their mobile ads. Instead these advertisers can turn to a single aggregator to create the mobile advertisements and optimize the placement of such advertisements across all third-party SMS message providers. This concept has been successful on the internet and is commonly described as an "ad network".

One desirable feature is for advertisements messages to be provided to third-party SMS services in an automated fashion through an API integration between an ad server and an SMS message application of the third-party SMS service. Advertisements are served to the SMS service provider only when specific targeting criteria are satisfied. This criteria is based on area code of the mobile phone number for SMS delivery, the time of day, and the content category code assigned to the SMS service provider. By providing this information to the ad server, along with the content of the outgoing message, the ad server can provide an advertisement that fits within the space requirements of a standard 160 character SMS message as well as one that meets the advertisers targeting preferences.

DESCRIPTION OF PRIOR ART

Distribution of advertisements to third-party services through a central aggregator has been in existence for many years. Mostly it has been utilized through the internet publishing medium, whereby central ad networks provide targeted text-based or display advertising to third-party websites.

There is a need to create a system for advertisement distribution based on simple targeting parameters available to all third-party SMS service providers.

It is a first object of this invention to provide targeted advertising over a network for display in third-party SMS messages on wireless handsets. It is a second object of this invention to utilize simple parameters that are inherent to every SMS message (recipient phone number, message text, and delivery time) for targeting purposes while working within the SMS character space constraints. It is a third object of this invention to report delivery statistics about advertisement placement and conversion response back to advertisers and third-party distributing affiliates.

U.S. Pat. No. 5,948,061 by Merriman is a "Method of Delivery, Targeting and Measuring Over Networks." It is a method for delivering advertising over a network to affiliate websites for display on web pages on the internet. It also is a method for controlling frequency of advertisements as well as collecting user profile data for future advertisement targeting. There is a need to deliver advertising intended for display on SMS messages on wireless handsets based on targeting parameters inherent to SMS messages while also considering SMS formatting constraints.

U.S. Pat. No. 6,381,485 by Chern is a "System and Method for Attaching an Advertisement to an SMS Message for Wireless Transmission." It is a method for attaching an advertisement to an alert message based on the character space available as well as other available profile information. A system monitors for alert conditions to be satisfied to send an SMS message. When conditions are met, a server selects and advertisement to attach to the outgoing SMS alert using the available character space as the primary constraint for advertisement placement. There is a need to create a system that separates the advertisement aggregator from the SMS message/alert provider so any message provider can receive advertisements as long as targeting conditions are satisfied.

There is still room for improvement within the art.

SUMMARY OF THE INVENTION

The present invention relates to methods, apparatuses and systems for distributing advertisements to third-party SMS content providers.

An ad server communicates with a requesting application over the network. The ad server receives a request from the application for an advertisement. The ad server locates an advertisement from the ad database that meets specified targeting conditions. When an advertisement is located, the server delivers the advertisement to the requesting application to append to the outgoing SMS message. The ad server then communicates with a reporting database to track delivery of advertisement.

DETAILED DESCRIPTION

Figure 1:
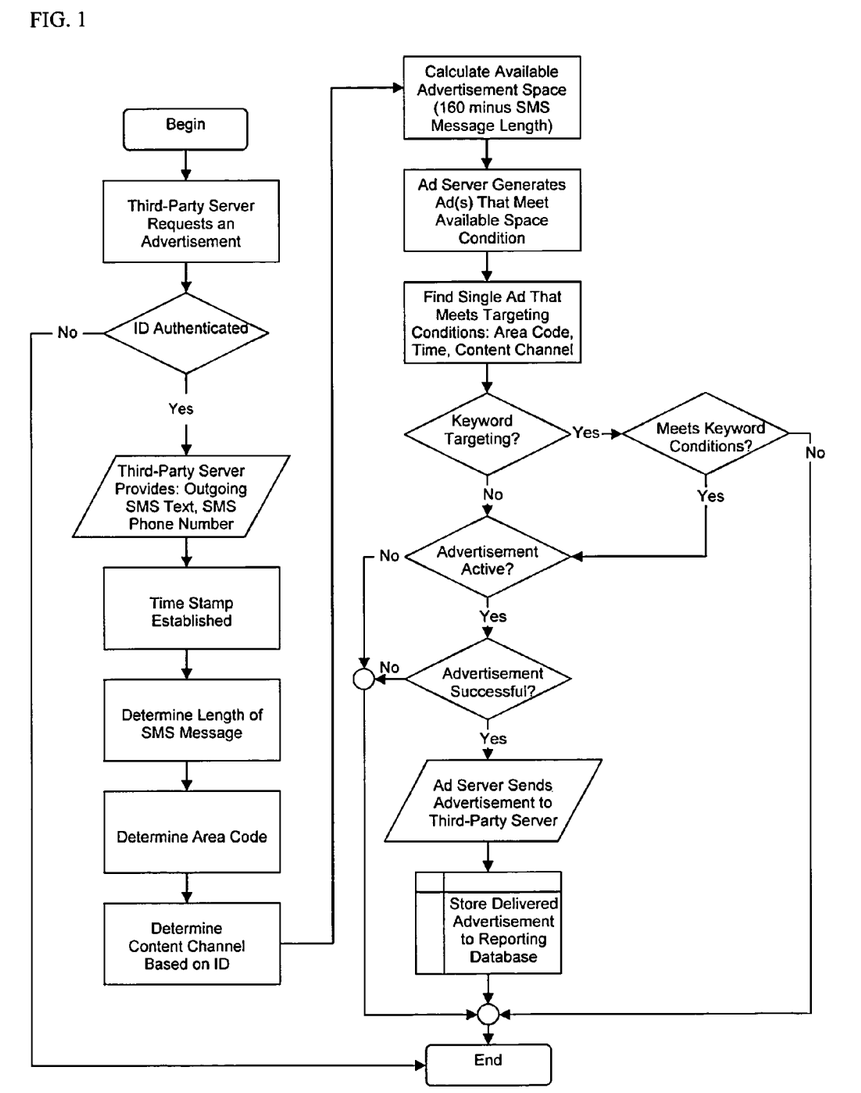
FIG. 1 is a flow chart diagram illustrating method of distributing a targeted advertisement to a third-party SMS content provider according to the present invention.

FIG. 1 is a flow chart diagram illustrating method of distributing a targeted advertisement to a third-party SMS content provider according to the present invention. The illustrated method begins when a third-party server requests an advertisement. The illustrated method further finds a single advertisement that meets targeting conditions, including area code, time, and content channel. The illustrated method may further perform keyword targeting.

Figure 2:
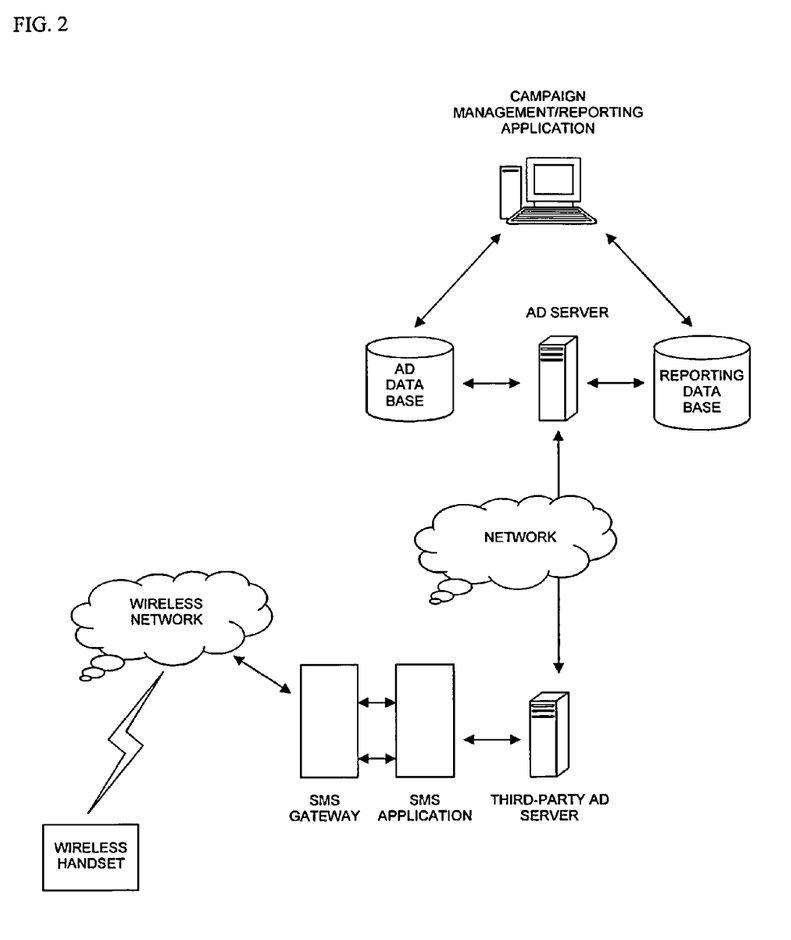
FIG. 2 is a block diagram of a computer network environment facilitating data exchange between the ad server and third-party requesting server according to the present invention.

FIG. 2 is a block diagram of a computer network environment facilitating data exchange between the ad server and third-party requesting server according to the present invention. FIG. 2 depicts a campaign management/reporting application in communication with an ad database and a reporting database; an ad server in communication with the ad database, the reporting database, and a third-party ad server; the third-party ad server in communication with an SMS application; the SMS application in communication with an SMS gateway; and the SMS gateway in communication via a wireless network a wireless handset.

Figure 3:
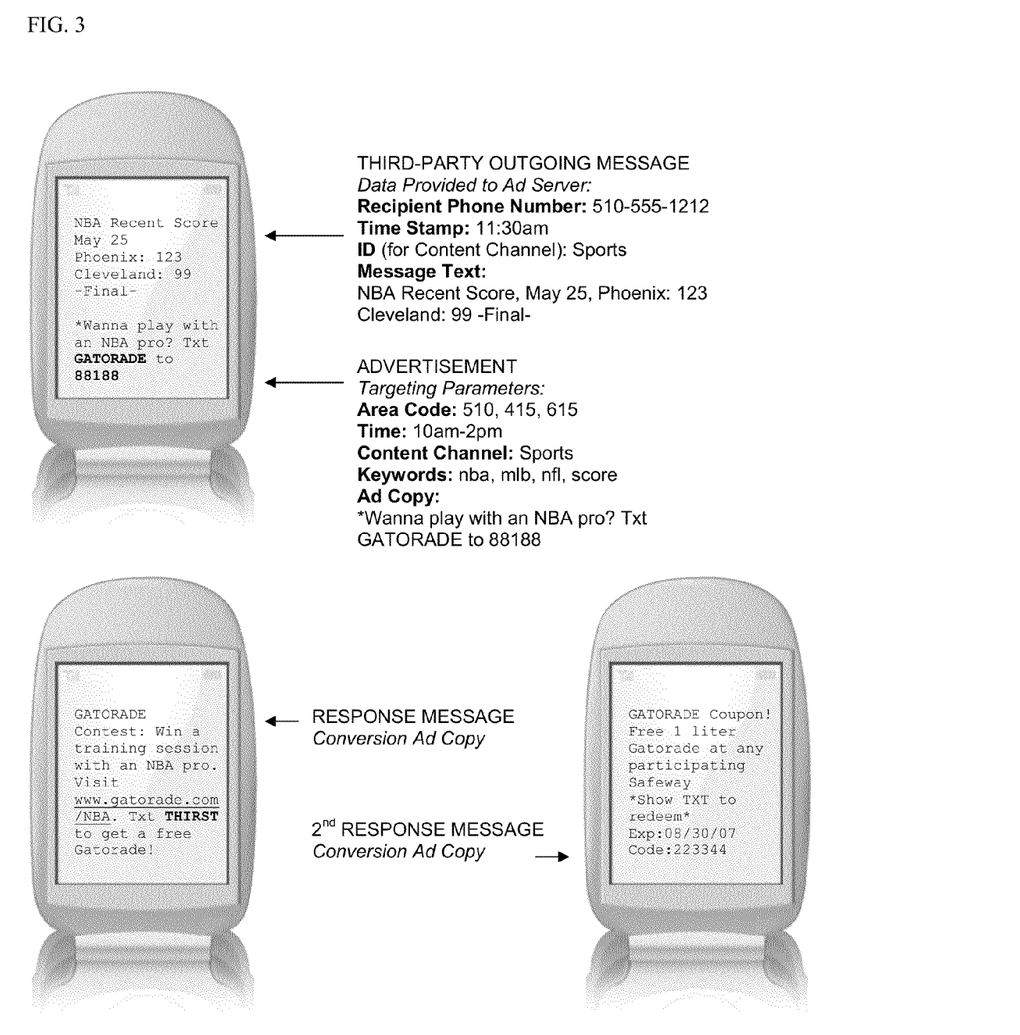
FIG. 3 illustrates a screenshot of the advertisement message attached to an SMS content message.

FIG. 3 illustrates a screenshot of the advertisement message attached to an SMS content message. The illustration shows the targeting parameters specified by the advertisement as well as the data provided by the third-party SMS content provider. Additionally a first and second response message is illustrated.

Figure 4:
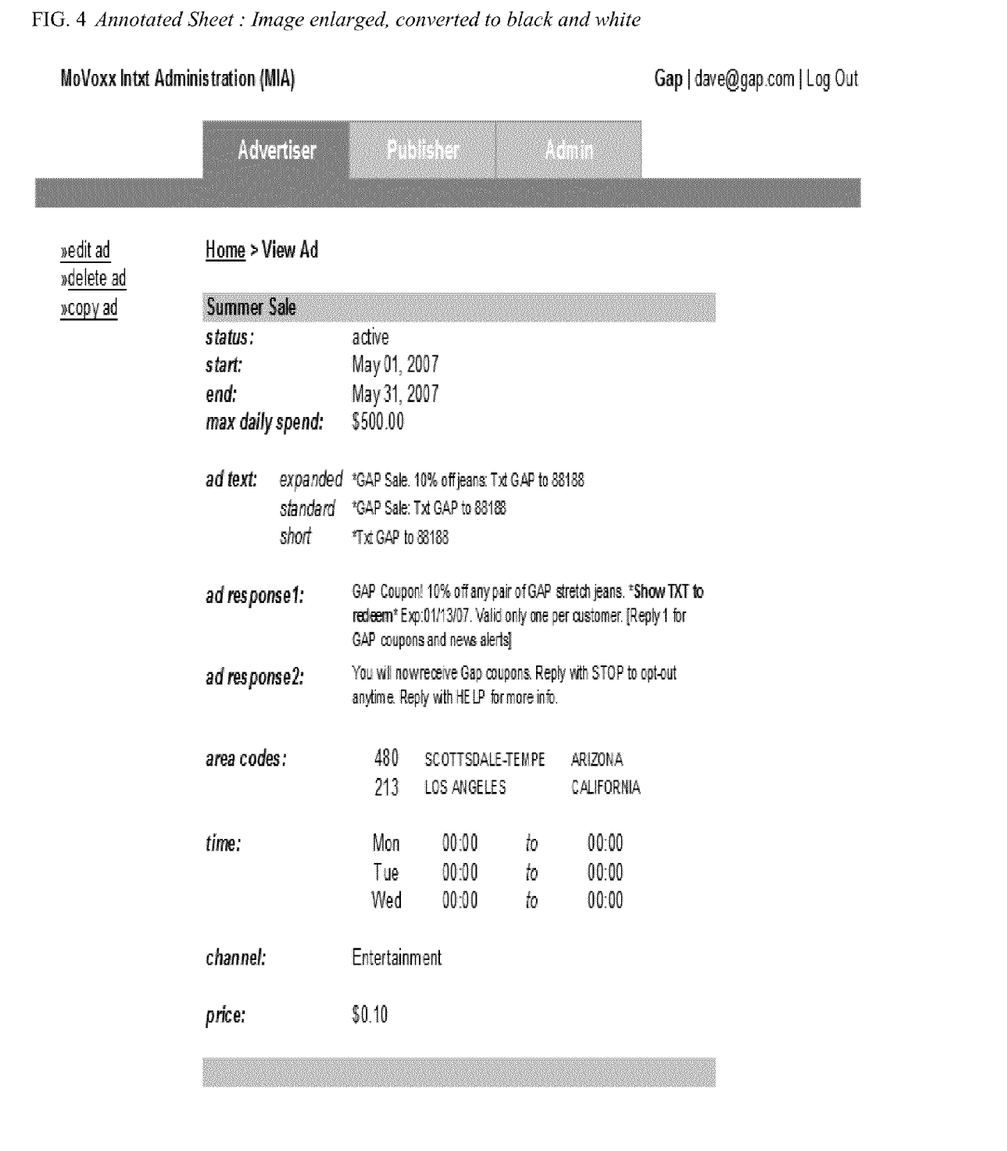
FIG. 4 is a screenshot of the graphical user interface for the campaign management application.

FIG. 4 is a screenshot of the graphical user interface for the campaign management application. FIG. 4 depicts example ad text, including expanded ("GAP Sale. 10% off jeans TXT GAP to 88188"), standard ("GAP Sale: Txt GAP to 88188"), and short ("Txt GAP to 88188").

Figure 5:
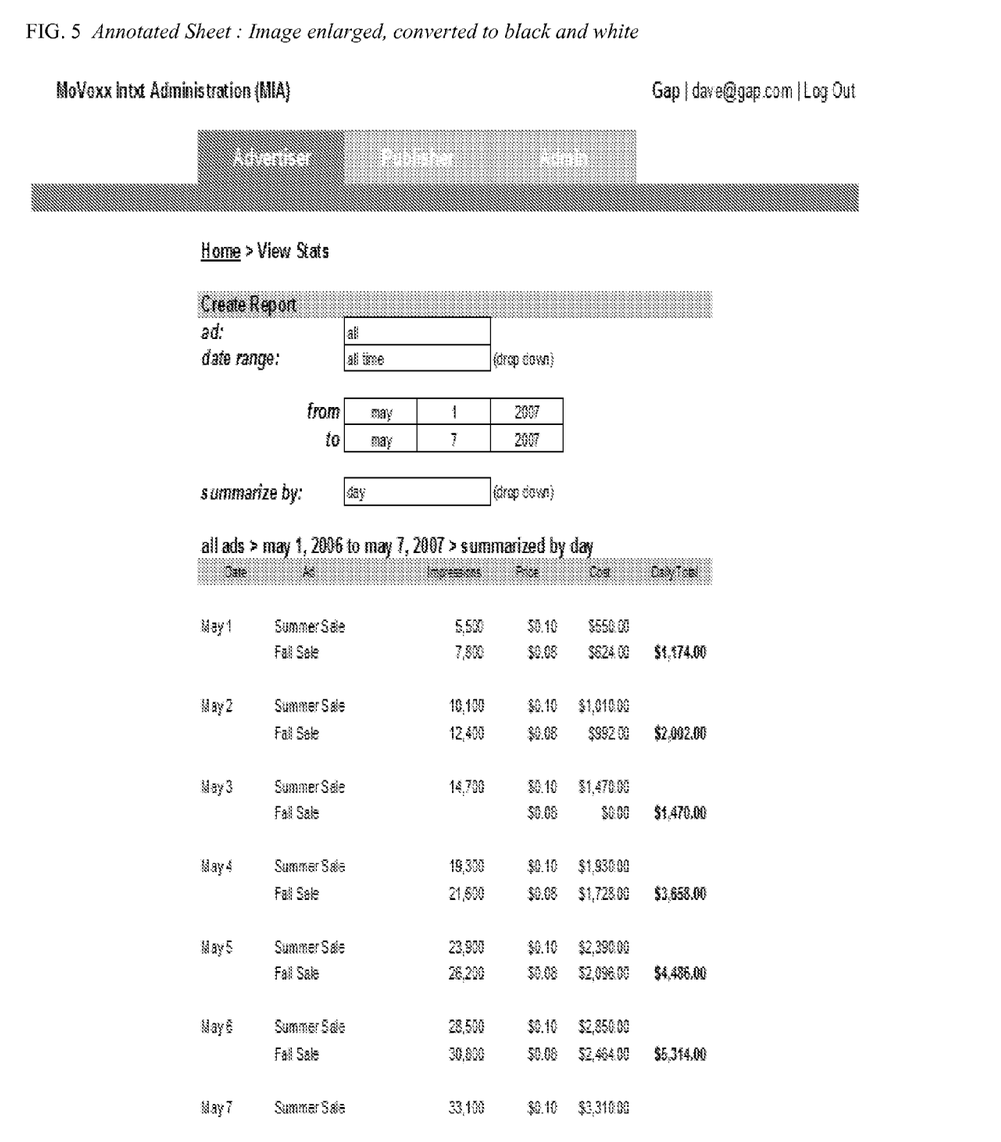
FIG. 5 is a screenshot of the graphical user interface for the advertiser reporting application.

FIG. 5 is a screenshot of the graphical user interface for the advertiser reporting application.

Figure 6:
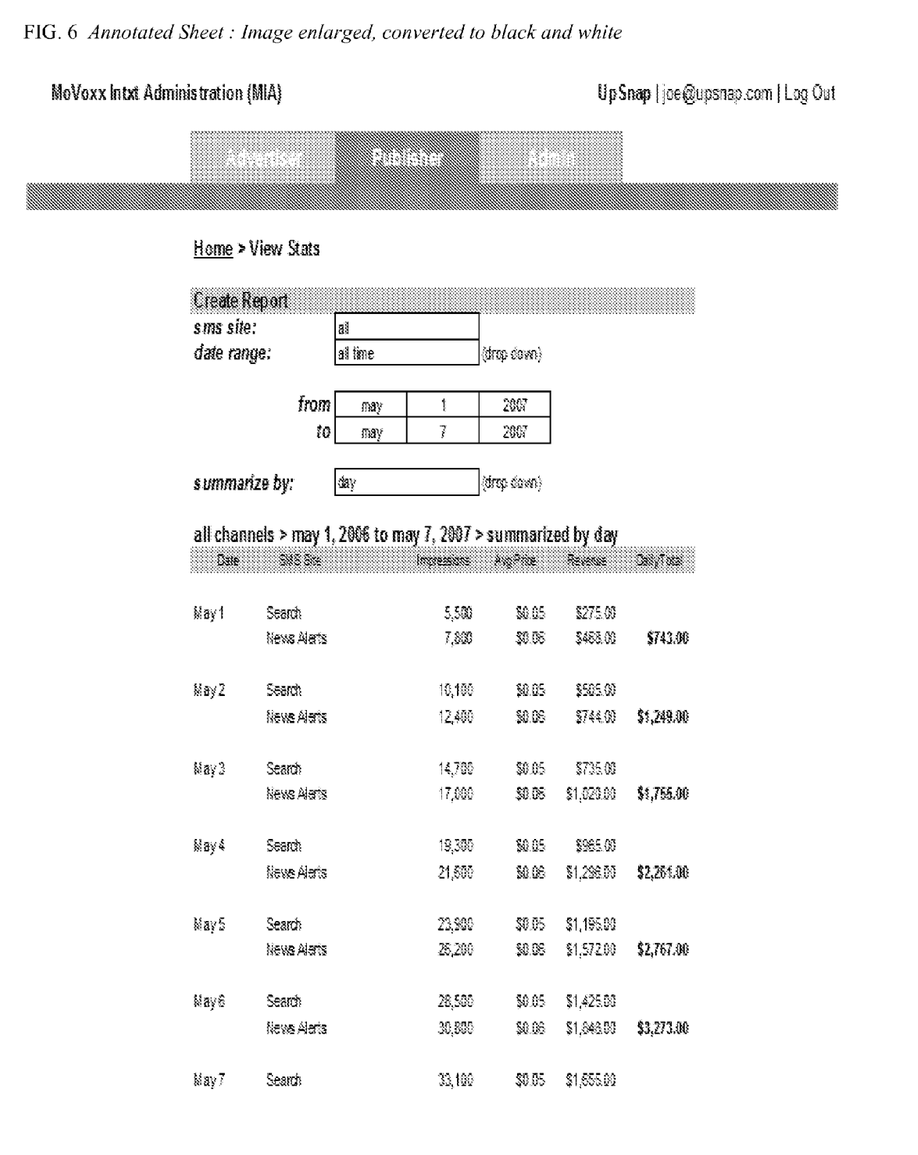
FIG. 6 is a screenshot of the graphical user interface for the third-party SMS content provider reporting application.

FIG. 6 is a screenshot of the graphical user interface for the third-party SMS content provider reporting application.

Advertisements are served according to the following steps a) through g):

a) ad server collects the text from the outgoing SMS messages, counts characters and subtracts from 160 to find available characters. The ad server finds all advertisements less than or equal to available characters.

b) phone number of destination device provides the area code. The ad server finds all advertisements that contain matching area code.

c) time of request provides a time stamp. The ad server selects all advertisements where time stamp falls within selected time ranges for delivery.

d) content-channel identification is provided by the requesting application.

The ad server selects all advertisements that contain matching content-channel identification e) keywords are identified from text of outgoing SMS message. The ad server selects all advertisements with matching keywords.

f) ad server selects the advertisement with the highest price.

g) ad server selects an advertisement at random.

Advertisements are created through a web-based campaign management application that communicates with an ad database. The campaign management application displays advertisement delivery and response statistics for advertiser billing as well as reporting for commission payments to SMS service providers.

What is claimed is:

1. A short message service (SMS) advertising distribution system facilitating advertisement message and data exchange between an advertisement aggregator and an SMS content provider, the system comprising:

an ad database storing at least one text-based advertisement with associated targeting parameters;

an application ad server operative to receive an advertisement request, select at least one advertisement that satisfies targeting parameters by performing a contextual keyword analysis of words contained in an SMS message body to look for at least one of plurals, misspellings, synonyms or popular text message grammar translations, and retrieve from the ad database one or more selected advertisements;

a third-party SMS application operative to send a request for advertisements to the application ad server, interact with an SMS gateway to format message protocol for the SMS gateway, transmit at least one message to a remote wireless device;

a campaign management application to create and manage advertisements within the ad database; and a reporting database to show advertisement delivery statistics, wherein advertisements are created in the campaign management application, wherein an advertisement is comprised of campaign parameters, targeting parameters, creative ad copy, conversion ad copy, and conversion types, wherein the creative ad copy is in the form of text; wherein several ad copy formats are presented, differing by character size; and wherein a single campaign contains several ad copy formats including:

55 character ad copy with spaces, 5 characters for formatting=60 total characters,     35 character ad copy with spaces, 5 characters for formatting=40 total characters, and     20 character ad copy with spaces, 5 characters for formatting=25 total characters;

wherein the creative ad copy contains a first conversion action to text a first keyword to a shortcode, then receive a first response message that contains a first conversion ad copy and a second keyword; and wherein conversion ad copy contains a second conversion action to opt-in to future alerts from an advertiser by replying with the second keyword to the first response message, then receive a second response message that contains a second conversion ad copy.

2. The system of claim 1 wherein the third-party SMS application provides message content, user phone number and time stamp to the application ad server.

3. The system of claim 1 wherein the third-party SMS application provides a unique identification number to the application ad server for authentication, advertisement retrieval, advertisement reporting, and content-channel.

4. The system of claim 3 wherein a content-channel is defined by a type of SMS content or service a third-party message provider distributes, the type including at least one of: news and information, mobile search, entertainment, sports, social communities (one to group messaging), and person to person messaging.

5. The system of claim 1 wherein the application ad server counts characters available in the at least one message transmitted from the third-party SMS application and selects advertisements from the ad database that have character counts less than or equal to available characters in the at least one message.

6. The system of claim 5 wherein a standard SMS message contains 160 alphanumeric characters including spaces.

7. The system of claim 1 wherein an advertisement has conditional targeting parameters established in the campaign management application that must be satisfied before being distributed for attachment to outgoing third-party SMS message, the conditional targeting parameters including at least one of: area code, time, content-channel, and contextual keyword.

8. The system of claim 7 wherein the area code is a U.S. area code found in a phone number of the remote wireless device receiving the transmitted message.

9. The system of claim 7 wherein the time is the time stamp is established when the third-party SMS application requests an advertisement.

10. The system of claim 7 wherein the SMS content provider is assigned a content-channel identification and will only be provided advertisements that match that content-channel designation.

11. The system of claim 7 wherein the contextual keyword includes a contextual keyword analysis of words contained in an SMS message body and those tagged to the advertisement, wherein the contextual keyword analysis looks for all of direct word matches, plurals, misspellings, synonyms, and popular text message grammar translations.

12. The system of claim 1 wherein an advertisement has conditional campaign parameters established in the campaign management application that must be satisfied before being distributed for attachment to an outgoing third-party SMS message, the conditional campaign parameters including at least one of:

advertisement campaign must be set to "active" status, time of server request must be between campaign start and end dates,     advertisement account must contain a positive balance, and     advertisement campaign must not exceed daily budget.

13. The system of claim 1 wherein the application ad server further selects advertisements from ad database based on the following rules:

determining maximum character length, determining area code match, determining time match, determining content-channel match, and determining contextual keyword match.

14. The system of claim 13 wherein when multiple ads meet campaign and targeting criteria, the advertisement with a higher price value will be selected.

15. The system of claim 1 wherein upon delivery of advertisement to the third-party SMS application, the application ad server sends receipt of delivery to the reporting database.

16. The system of claim 15 wherein the reporting database records total advertisements delivered to a third-party SMS message provider and a reporting application provides total commissions earned by the third-party SMS message provider and total fees owed by advertiser.

17. The system of claim 1 wherein the creative ad copy contains conversion types including at least one of:

reply to a message with keyword, then receive a response message containing conversion ad copy;

URL hyperlink to website; and toll-free or local tracking number.

18. The system of claim 17 wherein user responses to conversion types are submitted to the reporting database.

19. The system of claim 17 wherein each keyword is unique to each creative ad copy and an advertiser is billed for each user who texts in keyword or replies to a message with a keyword.

20. The system of claim 17 wherein each URL hyperlink is unique to each creative ad copy and the advertiser is billed for each visit through the URL hyperlink.

21. The system of claim 17 wherein each toll-free or local tracking number is unique to each creative ad copy and calls through the tracking number can be billed on a per-call basis to the advertiser.

22. The system of claim 17 wherein the conversion ad copy is sent by SMS to the user through the designated short code included in the creative ad copy.

23. The system of claim 1 wherein the campaign management application provides advertisement reporting summaries from the reporting database.

24. The system of claim 1 wherein the advertisement is composed of no more than 160 characters of text for delivery by SMS.

25. The system of claim 1 wherein the advertisement is composed of graphic images for delivery by MMS.

26. The system of claim 1 wherein the SMS content provider is any service that sends outgoing mobile terminated short message service (SMS) messages, whether that be content generated by the SMS content provider, content aggregated from other sources, or content generated by users themselves through person-to-person messaging.

27. The system of claim 1, wherein the at least one message includes the SMS message body and one of the one or more selected advertisements, wherein the advertisement includes the first keyword to text to the shortcode, and wherein the system is further configured to:

in response to receipt of the first keyword texted to the shortcode, transmit an SMS message that includes the first response message and the second keyword; and     in response to receipt of a reply that includes the second keyword, transmit an SMS message that includes the second response message.

\* \* \* \* \*